United States Patent
Schulz

[11] Patent Number: 5,606,161
[45] Date of Patent: Feb. 25, 1997

[54] ELECTRO-OPTICAL MODULE HAVING A Y-SHAPED SPRING ELEMENT

[75] Inventor: Klaus Schulz, Berlin, Germany

[73] Assignee: Siemens Aktiengesellschaft, Munich, Germany

[21] Appl. No.: 505,216

[22] PCT Filed: Feb. 1, 1994

[86] PCT No.: PCT/DE94/00119

§ 371 Date: Sep. 25, 1995

§ 102(e) Date: Sep. 25, 1995

[87] PCT Pub. No.: WO94/18586

PCT Pub. Date: Aug. 18, 1994

[30] Foreign Application Priority Data

Feb. 5, 1993 [DE] Germany .......... 43 03 780.1

[51] Int. Cl.$^6$ .................. H01J 5/02; G02B 6/36
[52] U.S. Cl. .................. 250/239; 385/89; 385/92
[58] Field of Search .......... 250/227.11, 239; 385/53, 73, 88–90, 92

[56] References Cited

U.S. PATENT DOCUMENTS

| | | | |
|---|---|---|---|
| 4,553,813 | 11/1985 | McNaughton et al. | 385/89 |
| 4,720,630 | 1/1988 | Takeuchi et al. | 382/92 |
| 5,104,242 | 4/1992 | Ishikawa | 385/53 |
| 5,134,679 | 7/1992 | Robin et al. | 385/90 |
| 5,243,678 | 9/1993 | Schaffer et al. | 385/92 |
| 5,324,936 | 6/1994 | Ochiai | 250/239 |
| 5,416,872 | 5/1995 | Sizer, II et al. | 385/92 |

FOREIGN PATENT DOCUMENTS

WO91/11743  8/1991  WIPO.

OTHER PUBLICATIONS

Patent Abstracts of Japan, vol. 4, No. 115, 28 May 1980 & JP-A-55-070 803 (Noppon Denshin Denwa).
Patent Abstracts of Japan, vol. 6, No. 265, 30 Sep. 1982 & JP-A-57 158 606 (Fujitsu).
Patent Abstracts of Japan, vol. 6, No. 245, 3 Sep. 1982 & JP-A-57 142 607 (Yamatake Honeywell).
Prospectus "Fiber Optic Components" by Siemens A. G., Munich Germany, Edition EC 0291.

Primary Examiner—Stephone Allen
Attorney, Agent, or Firm—Kenyon & Kenyon

[57] ABSTRACT

A spring element is arranged in the housing of an electro-optical module such as to cover the active surface of an electro-optical component such as a laser diode when in its rest position. When a connecting element is introduced through an opening in the housing the spring element is deflected against the restoring force of the spring into a position in which it frees the active surface.

14 Claims, 1 Drawing Sheet 5,606,161

ELECTRO-OPTICAL MODULE HAVING A Y-SHAPED SPRING ELEMENT

BACKGROUND OF THE INVENTION

This invention relates to electro-optical modules in general and more particularly to the type of electro-optical module which includes a housing and at least one electro-optical component, to whose optical active surface a connecting element that is insertable into a housing opening is capable of being optically coupled.

Electro-optical modules are understood, for example, to be the modules and, in particular, what are referred to as transceivers, for example, in the Siemens AG prospectus "Fiber Optic Components", issue EC 0291. These known electro-optical modules have a housing, in or on which at least one electro-optical component is retained. The electro-optical component can be a laser transmitting diode, for example, whose optical active surface—i.e., the output face of the light transmitted by the component—is capable of being optically coupled to a connecting element. For this purpose, the housing has an opening into which the connecting element is insertable. In addition or alternatively, the housing can also contain a component designed as a receiver, which converts light energy acting on its optical active surface into electrical signals.

So long as a connecting element has not been inserted into the housing opening and coupled to the electro-optical component, impurities can intrude into the housing and adversely affect the optical active surfaces; also light can unintentionally strike the active surface, so that, in such a case, a receiver would supply unwanted output signals. Electro-optical components, which are designed as high-energy light transmitters (e.g. laser diodes), pose a special danger, because the radiation they emit can do permanent damage, for example, to the eyes (especially to the retinas) of living beings. This danger is especially prevalent when the driving circuit for the transmitter is defective, as this results in a lasting or periodic uncontrolled transmission signal.

Therefore, there is a need to create an electro-optical module, whose electro-optical component(s) is or are protected from impurities and damage from the outside and/or where, when unconnected an unintentional incidence of light on the component or emergence of light from the component is reliably prevented.

SUMMARY OF THE INVENTION

In accordance with the present invention this need is fulfilled in an electro-optical module of the general type described above by a spring element, which is disposed in the housing, which is displaceable out of a position of rest, and which, when viewed from the housing opening, covers the optical active surface of the component. When the connecting element is inserted, it opposes the restoring force of the spring, displacing it into a position that clears the active surface. In the position of rest of the spring element, the optical active surface can be covered by a radiation-impervious body arranged in the spring element or preferably by a section of the spring element itself. An important advantage of the present invention resides in the fact that, because of the spring restoring force, as a general principle, the spring element is forced back into its position of rest covering the active surface of the component. This guarantees that, immediately upon removal of the connecting element, the active surface of the component is reliably protected and, if applicable, the surrounding area is protected from the uncontrolled emergence of light out of a component designed as a transmitter. Thus, when a laser transmitter is used, the design of the electro-optical module according to the present invention enables a Class 1 rating pursuant to DIN VDE 0837 (German translation of the corresponding European Standard IEC Standard 825), which requires that, without the user taking specific precautions for his or her protection, damage caused by the laser device is always ruled out. The guarantee that is decisive for this classification, that the radiation from a laser device cannot reach the user, is achieved in accordance with the present invention by an extremely simple and, nevertheless, highly effective design.

The spring element can be an elastically deformable member or a spring-loaded member; one refinement of the invention that is especially advantageous with respect to manufacturing and assembly provides for the spring element to be a leaf spring.

The spring element preferably consists of metal; it can also be made of plastic and be joined to the housing, for example, by means of ultrasonic welding.

A further increase in the performance reliability of the electro-optical module according to the present invention is achieved by having an additional spring element act on the spring element to increase the spring restoring force.

The active surfaces of two electro-optical components (e.g., one transmitter and one receiver) disposed in the housing are preferably covered by one single spring element in its position of rest and cleared upon its deflection.

One structural refinement of the spring element that is especially advantageous in this regard is one in which the spring element has a Y-shaped design and the unattached sides of the Y form cover the active surfaces of the electro-optical components.

DETAILED DESCRIPTION

Figure 1:
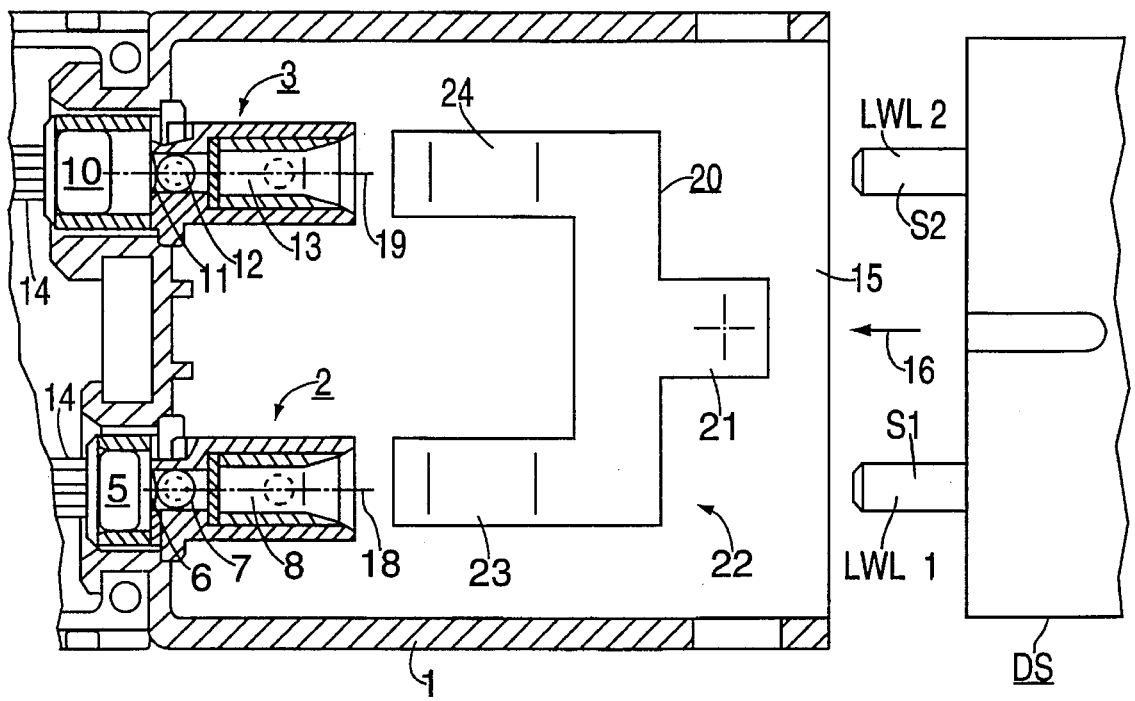
FIG. 1 is a section in a horizontal plane through a first embodiment of an electro-optical module according to the present invention.

The electro-optical module shown in FIG. 1 has a housing 1, on which two electro-optical components 2 and 3 are retained. The component 2 comprises a receiving diode 5, onto whose optical active surface 6, light signals from a coupling element, which is only schematically depicted and is insertable into a receptacle 8, are directed via a spherical lens 7. The coupling element is a first connector pin S1 having an optical waveguide LWL1 in its central bore; the connector pin S1 constitutes part of a connecting element DS only hinted at in the drawing, in the form of a so-called duplex connector.

The second electro-optical component 3 contains a laser diode 10, whose radiation, emitted via an optical active surface 11 and a spherical lens 12, is able to be coupled into a further coupling element (second connector pin S2 having a central optical waveguide LWL2) that is insertable into a receptacle 13. The receiving diode 5 and the laser diode 10 are linked via electrical connections 14 to receiving and driving circuits, respectively. The receptacles 8 and 13 are properly adjusted to the outside diameters of the connector pins S1 and S2, so that an optimal coupling of the ends of the optical waveguides LWL1 and LWL2 to the optical active surfaces 6 and 11 is guaranteed.

The duplex connector DS is insertable through a housing opening 15 of the housing 1 in the direction of the arrow 16 to couple its connector pins S1 and S2 to the receptacles 8 and 13. The unattached sides of a Y-shaped spring element 20 of plastic or metal project into the optical axes 18 and 19, between the optical active surfaces 6 and 11 and the housing opening 15. The base region 21 of the spring element 20 is affixed to one housing side 22 by ultrasonic welding. Viewed from the housing opening 15, the unattached sides 23 and 24 of the Y-shaped spring element 20 cover the active surfaces 6 and 11 of the electro-optical components 2 and 3 when spring element 20 is in the rest state. The active surfaces can also be covered by radiation-impervious bodies that are secured to the unattached sides 23 and 24. With respect to the number of individual parts needed and manufacturing outlay, it is especially advantageous for the spring element 20 itself (e.g. by means of its sides 23 and 24) to assume the covering function for the active surfaces.

When the connecting element DS is inserted, the unattached sides 23 and 24 are displaced toward the housing side 22 in opposition to the spring restoring force. As a result, the active surfaces 6 and 11 are moved out of the way as viewed from the housing opening 15. However, in this state, no danger to the active surfaces 6 and 11, in particular, no danger of light emission from the active surface 11 of the laser diode 10 arises, because the housing opening 15 is substantially shielded from the outside by the already substantially inserted connecting element DS.

Figure 2:
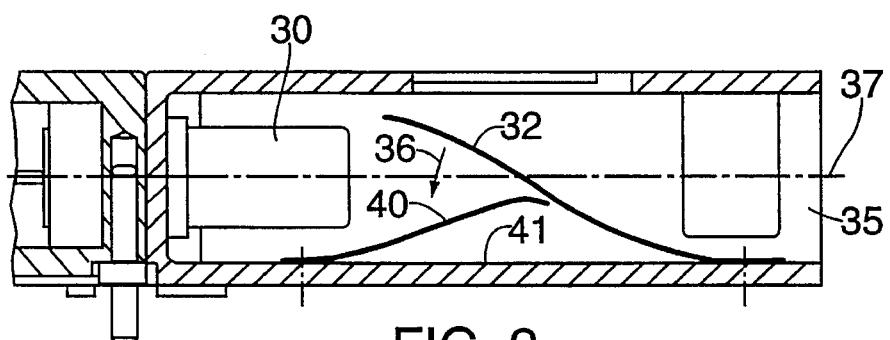
FIG. 2 is a section in a vertical plane of a second embodiment of an electro-optical module according to the present invention.

FIG. 2 depicts a second embodiment of an electro-optical module according to the present invention. In this embodiment the optical active surface of an electro-optical component 30 designed as a laser diode, i.e., a transmitter, is covered by a single rectangular leaf spring 32 with respect to a housing opening 35. When a connecting element (not shown) is introduced through the housing opening 35, the leaf spring 32 is displaced out of its position of rest in opposition to its spring restoring force in the direction of the arrow 36 and thereby clears the optical axis 37 between the housing opening 35 and the optical active surface. An additional spring element 40 in the form of another leaf spring is secured to the housing side 41 to increase the spring restoring force. To enhance performance reliability, the additional spring element 40 can also cover the optical active surface with its unattached end in the position of rest. The leaf spring 32 is riveted on to the housing side 41. The spring restoring force of the spring 20 could also be increased in the same manner in the embodiment according to FIG. 1.

Figure 3:
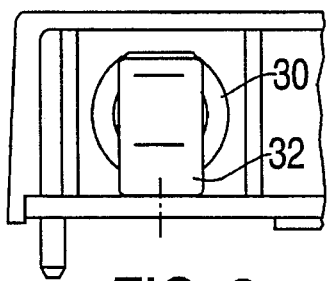
FIG. 3 is a front elevation view of an alternative design of a module according to the present invention.

To further illustrate the covered optical active surface of the component 30 in the rest state of the leaf spring 32, FIG. 3 depicts a front elevation view of the module in accordance with FIG. 2. One can discern from FIGS. 2 and 3 that the leaf springs 32 and 40 are only displaced when the connecting element is inserted to the greatest possible extent, damage to the surrounding area being prevented, for example, in the case of a defective driving circuit for the laser diode 30 by the shielding of the inserted connecting element. As a result, the emitted radiation cannot reach the user in any case. In the installed state of the electro-optical module, the spring elements 20 (FIG. 1) or 32 and 40 (FIG. 2) can be arranged on the top housing side, so that, in the case of a spring break or spring fatigue, the spring element hangs down from the top while covering the optical active surface.

I claim:

1. An electro-optical module comprising:

a housing having an opening adapted to receive a connecting element;

first and second electro-optical components disposed in said housing, said components each having an optical active surface;

first and second receptacles associated with said first and second components respectively into each of which is insertable an optical-waveguide connector pin of a connecting element that is insertable into said housing opening to enable optical coupling to the active surfaces; and a spring element, which has a Y-shaped design including a base and two sides, said base attached to said housing and said two sides unattached, said side including radiation impervious surfaces, said spring element disposed in the housing in front of the receptacles in such a way that, in a rest position the restoring force of the spring causes the radiation impervious surfaces, as viewed from said housing opening, to cover the active surfaces of the electro-optical components, and whereby, when a connecting element is inserted into said housing, the unattached sides are displaced out of the rest position in opposition to the restoring force of the spring into a position that moves radiation impervious surfaces away from and clear of the active surfaces to open an optical path from said active surfaces to said connecting element.

2. The electro-optical module according to claim 1 and further including an additional spring element acting on said spring element to increase the spring restoring force.

3. The electro-optical module according to claim 1 wherein said unattached sides form said radiation impervious surfaces.

4. The electro-optical module according to claim 3 and further including an additional spring element acting on said spring element to increase the spring restoring force.

5. The electro-optical module according to claim 1 wherein said radiation impervious surfaces comprise radiation impervious bodies disposed on said unattached sides.

6. The electro-optical module according to claim 5 and further including an additional spring element acting on said spring element to increase the spring restoring force.

7. The electro-optical module according to claim 1, wherein said spring element is made of metal.

8. The electro-optical module according to claim 7, wherein said spring element is welded to said housing.

9. The electro-optical module according to claim 1, wherein said spring element is made of plastic.

10. The electro-optical module according to claim 9, wherein said spring element is welded to said housing.

11. The electro-optical module according to claim 9 and further including an additional spring element acting on said spring element to increase the spring restoring force.

12. The electro-optical module according to claim 11, wherein said further spring element is riveted to said housing.

13. The electro-optical module according to claim 11 and further including an additional spring element acting on said spring element to increase the spring restoring force.

14. The electro-optical module according to claim 11, wherein said further spring element is riveted to said housing.

\* \* \* \* \*